June 5, 1962 R. W. HOWMAN 3,037,567

PREWIRED INTERCONNECTORS FOR REMOTE CONTROL OF PROGRAM DISTRIBUTION AND INTERCOMMUNICATION

Filed Aug. 29, 1958 5 Sheets-Sheet 1

INVENTOR.
RALPH W. HOWMAN
BY
Gustave Miller
ATTORNEY

June 5, 1962 R. W. HOWMAN 3,037,567

PREWIRED INTERCONNECTORS FOR REMOTE CONTROL OF PROGRAM DISTRIBUTION AND INTERCOMMUNICATION

Filed Aug. 29, 1958 5 Sheets-Sheet 2

INVENTOR.
RALPH W. HOWMAN
BY
Gustav Miller
ATTORNEY

INVENTOR.
RALPH W. HOWMAN
BY
Gustav Miller
ATTORNEY

INVENTOR.
RALPH W. HOWMAN
BY
Gustave Miller
ATTORNEY

INVENTOR.
RALPH W. HOWMAN
BY
Gustave Miller
ATTORNEY 3,037,567
Patented June 5, 1962

3,037,567

PREWIRED INTERCONNECTORS FOR REMOTE CONTROL OF PROGRAM DISTRIBUTION AND INTERCOMMUNICATION

Ralph W. Howman, 1925 Morningside, Garland, Tex.
Filed Aug. 29, 1958, Ser. No. 757,972
5 Claims. (Cl. 179—1)

This invention relates to audio intercommunication remote control and distribution systems and the like, having an integrated prewired system of remote controls and sound reproduction for a plurality of remote stations.

The main object of this invention is to construct a built-in system of wiring cables and intercommunication remote controls for several stations adaptable for hook-up with an audio unit at one of the stations, so that the other stations may remotely control this unit from their respective locations as well as selectively control their communication with any one or more of the other remote stations, such as may be located in different rooms of a dwelling house, the cables being of random lengths with plugs having complementary terminal arrangements corresponding to the terminal plugs at the audio station and at each of the remote stations, three way connector plugs being provided for insertion between sections of the extension cable of the distribution line for the parallel extension to each intervening station, thus providing for easy installation of the system including the wiring, by an inexperienced amateur.

A further object is to provide a complete built-in system of audio and intercommunication apparatus and wiring as described above, that can be added to existing home structures by an amateur without knowledge of wiring diagrams, and without doing any wiring other than the installation of the cable sections of suitable lengths through the walls and ceilings of the several rooms, making suitable openings in the walls and ceiling to set the audio and intercommunication units and control apparatus in said openings.

A further object is to provide extra switches and conductor means in the above controls and cables to adapt them for the addition of other appliances to the system, such as radio receivers, TV's etc. at one or more of the stations which may be controlled remotely from any of the other stations, and to provide continuously variable level at the local speaker, and step control of level of program material over all stations, as well as remote switching of the TV or other appliances at any station.

A further object is to make the cables for the above system in random lengths for maximum flexibility in adapting the system to any distribution of the stations within the building that may be desired.

A further object is to make a completely flexible system of feed-through parallel switching wiring plus series parallel hook-up of loudspeakers, made possible by special design of a printed circuit board plug used to interconnect cables to different stations and to drop cables to station control units, so as to permit adding stations while maintaining proper speaker and output impedance match.

A further object is to match the plugs and dimensions of the tuner and pre-amp unit to accommodate existing audio components, such as tuners, preamplifiers and power amplifiers, so that the switching unit plus associated items, such as one or more loudspeakers and connecting cables, are all that are needed to add all the above advantages to existing popular brands of manual control units for one room.

A further object is to provide means in the above system for changing all or any one of the stations from a system having both speaker and microphone live (where any station may answer a call without pushing a button) to a system where the microphone is connected only when an intercommunication control button is depressed and local speaker is then shunted, by moving one jumped from one pair of terminals to another pair in the control switch, thus allowing for optimum convenience of operation, where feed-back is no problem—or connection so as to overcome severe speaker to microphone acoustic feed-back problems, where the "home mechanic" has placed the speaker too close to the microphone.

A further object is to provide a timer clock in the system to turn the system on or off automatically at predetermined times.

Other and more specific objects will appear in the following detailed description of one system made in accordance with the present invention, as illustrated in the accompanying drawings, wherein.

The illustrated system may be seen to be a complete apparatus providing features of a custom-built music system for any home adaptable for installation by anyone familiar with the use of a saw, a drill and a screw driver. At the same time, it saves the cost of custom wiring requiring the services of an electronics technician, by providing unique pre-wired interchangeable hidden cables and drop cords, while adding remote control features seldom found in the most expensive installations. It is adaptable to the use of all popular make components.

A typical installation in a six room house, providing remote stations in each room, should be accomplished in four hours by a novice, or in two hours by an experienced installer. Additional units may be added singly without upsetting the impedance-matching. No soldering or cutting of wires should be required in any installation. All units are quickly removable for service. All cables have color coded plugs to avoid errors. Low voltage power supply furnishes direct current for switching, transistor amplifiers or tube filaments in the switching and intercommunication preamplifier unit.

Figure 1:
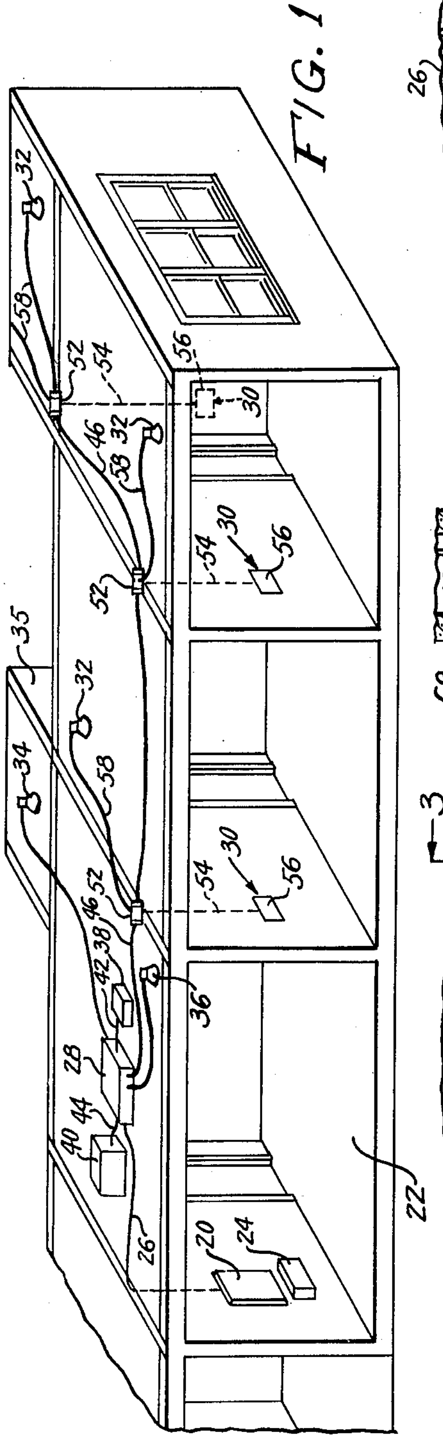
FIG. 1 is a diagrammatic illustration of several rooms and an entrance to a dwelling broken away to show the distribution of the several units in a system providing control stations in three separate rooms besides the main room where the audio unit is located, and a speaker only is located at the entrance, without controls.

For purposes of illustration of the present invention an installation is shown in FIG. 1, comprising a tuner and pre-amp panel 20 on the wall of the living room 22, with a roll-out changer 24 fitted in a compartment between studs in the wall underneath the panel 20.

These wall units are connected by cable 26 through the switching and intercommunication preamplifier unit 28, to the several remote control stations 30 and their respective loudspeakers 32 in other rooms of the house, and to similar loudspeakers 34 and 36 in the entrance to the house 35 and in the living room 22, respectively. These loudspeakers may be suitably installed in openings in the ceiling. Unit 28 may be installed in the attic above the living room ceiling, where the low voltage power supply 38 and power amplifier 40 have cable connections 42 and 44 to unit 28.

All cables 46 between unit 28 and the several stations connected in parallel, are selected of random lengths to suit the requirements of any particular installation. These cables are pre-fabricated to include all the connectors to the individual stations, and have a common type of terminal female plugs 48 at their ends for plugging onto complementary male plugs 50 at the unit 28 and on opposite sides of the connector boxes 52 at the junctions with the drop cords 54 to each control station panel 56. The drop cords 54 are internally connected in the boxes 52 to the terminal connectors of the plugs 50, have male plugs 111 similar to the plugs 50 at the lower ends for connection to corresponding female plugs 48 in the control panels of the respective remote control stations. The drop cords may readily be installed in the walls by inexperienced electricans, by dropping one end down between studs to the control panel opening in the wall in which the control panel 56 is installed. The terminal connectors on the male plugs 50 of the boxes 52 and 111 at the lower ends of the drop cords, may be of the printed circuit type for sliding contact with the rows of contacts in the female plugs 48. The plugs are complementarily formed, and are coded so that they cannot be reversely connected end for end, as by placing red or blue dots at the corresponding end of each plug.

The boxes 52 are provided with minature female plugs 51 wired to the proper connectors for connection to speaker leads 58 with mating male tips 55.

Figure 4:
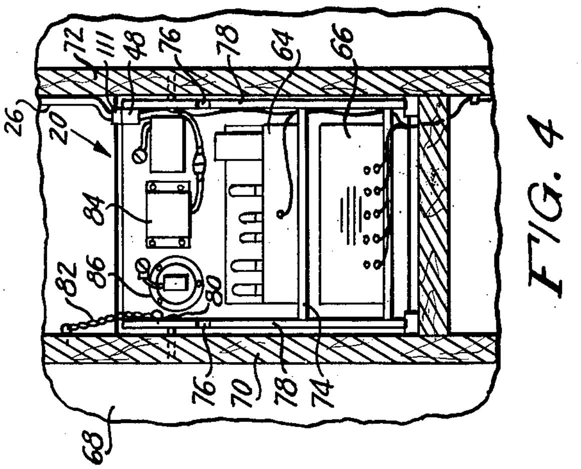
FIG. 4 is a rear sectional view taken on the line 4—4 in FIG. 3.
Figure 3:
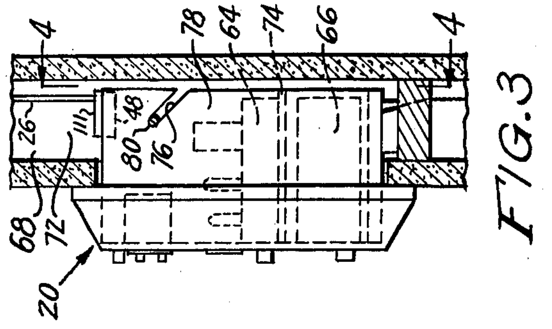
FIG. 3 is a side section taken through the wall on the line 3—3 in FIG. 2.
Figure 2:
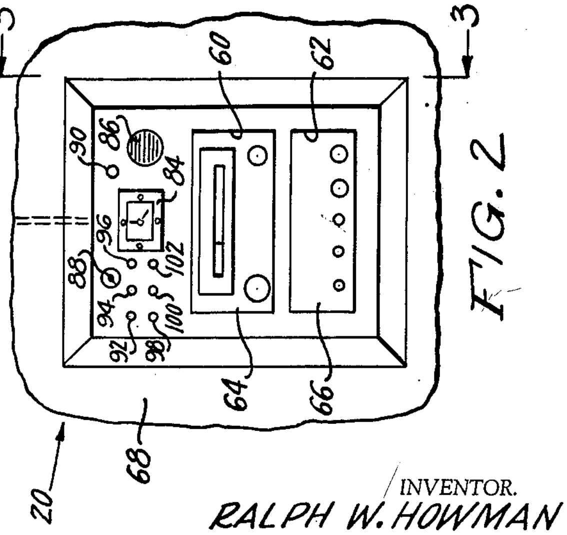
FIG. 2 is an elevation of the front of a tuner and preamplifier unit set in the wall of the main room, with a control panel and timer clock mounted therein.

Some of the details of the tuner and preamplifier master unit 20 are illustrated in FIGS. 2, 3 and 4. The openings 60 and 62 in the panel of unit 20 are pre-cut to dimensions of popular tuners and preamplifiers such as 64 and 66, respectively, which are set in the wall 68 between studs 70 and 72, on a frame 74 with guide hanger slots 76 in its sides 78 hung over lag screws 80 on the inner sides of the studs. A limit chain 82 holds the unit from falling out when the panel and frame are pulled out of the wall and lifted off the lag screws.

The upper part of the panel is provided with a timer clock 84, a mike 86, and control switches, including local volume control 88, intercommunication level control 90, and switches 92, 94, 96, 98, 100 and 102 for intercommunication, talk, remote level, entrance on-off, listen, and extra controls respectively.

Figure 7:
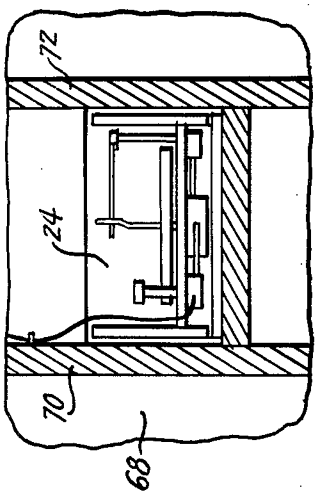
FIG. 7 is a sectional rear view of the record player taken on the line 7—7 of FIG. 6.
Figure 6:
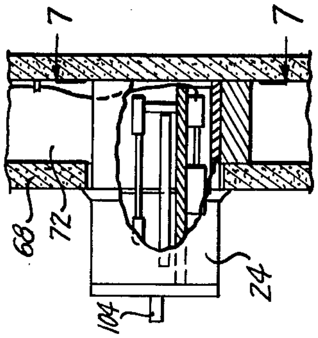
FIG. 6 is a side view of the record player, partly broken away, through the wall taken on the line 6—6 of FIG. 5.
Figure 5:
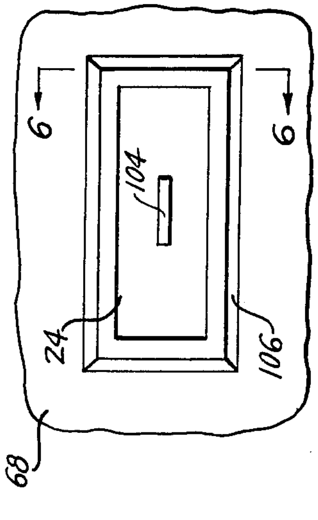
FIG. 5 is an elevation of the front of the record player unit mounted in the wall below the tuner and preamplifier unit.

Some details of the roll-out changer or compartment with the record player 24 may be seen in FIGS. 5, 6 and 7. The front of this unit has a handle 104. The cut in the wall for this unit is framed by collar 106, against which the front may be pushed into closed position if there is room for it back of the wall. In this position the compartment would extend through the rear of the wall into the adjoining room which may be a closet, garage, etc. However, this unit may be mounted in a 4 inch wall without extending through it.

Figure 10:
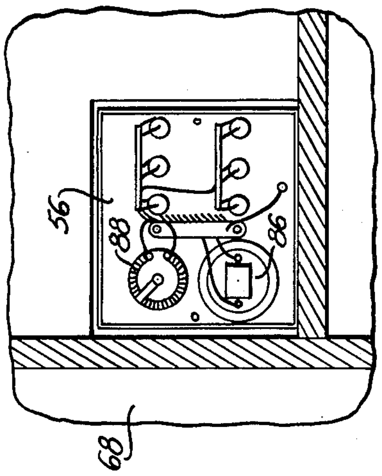
FIG. 10 is a rear sectional view of the control panel taken on the line 10—10 in FIG. 9.
Figure 9:
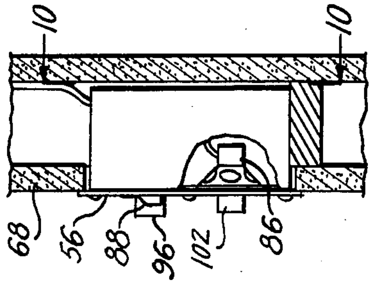
FIG. 9 is a side sectional view of the control panel, taken through the wall on the line 9—9 of FIG. 8, partly broken away to show the microphone mounted in the control panel.
Figure 8:
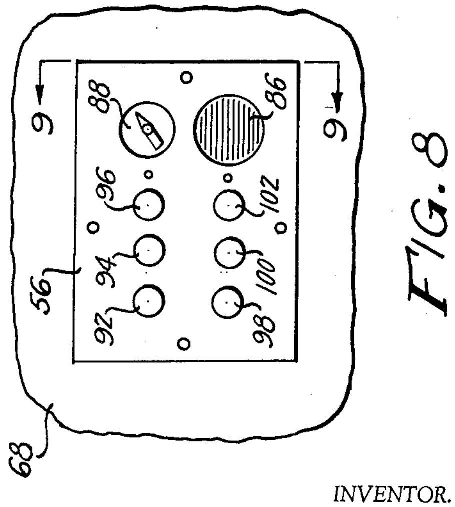
FIG. 8 is an elevation of the front of one of the remote station control panels set in the wall of one of the other rooms.

Details of the mounting of one of the control panels 56 at the remote stations may be seen in FIGS. 8, 9 and 10. These panels comprise duplicate controls of the switches 88, 92, 94, 96, 98, 100 and 102 as well as the mike 86 on the upper part of the tuner and preamplifier unit panel 20.

Figures 11, 14:
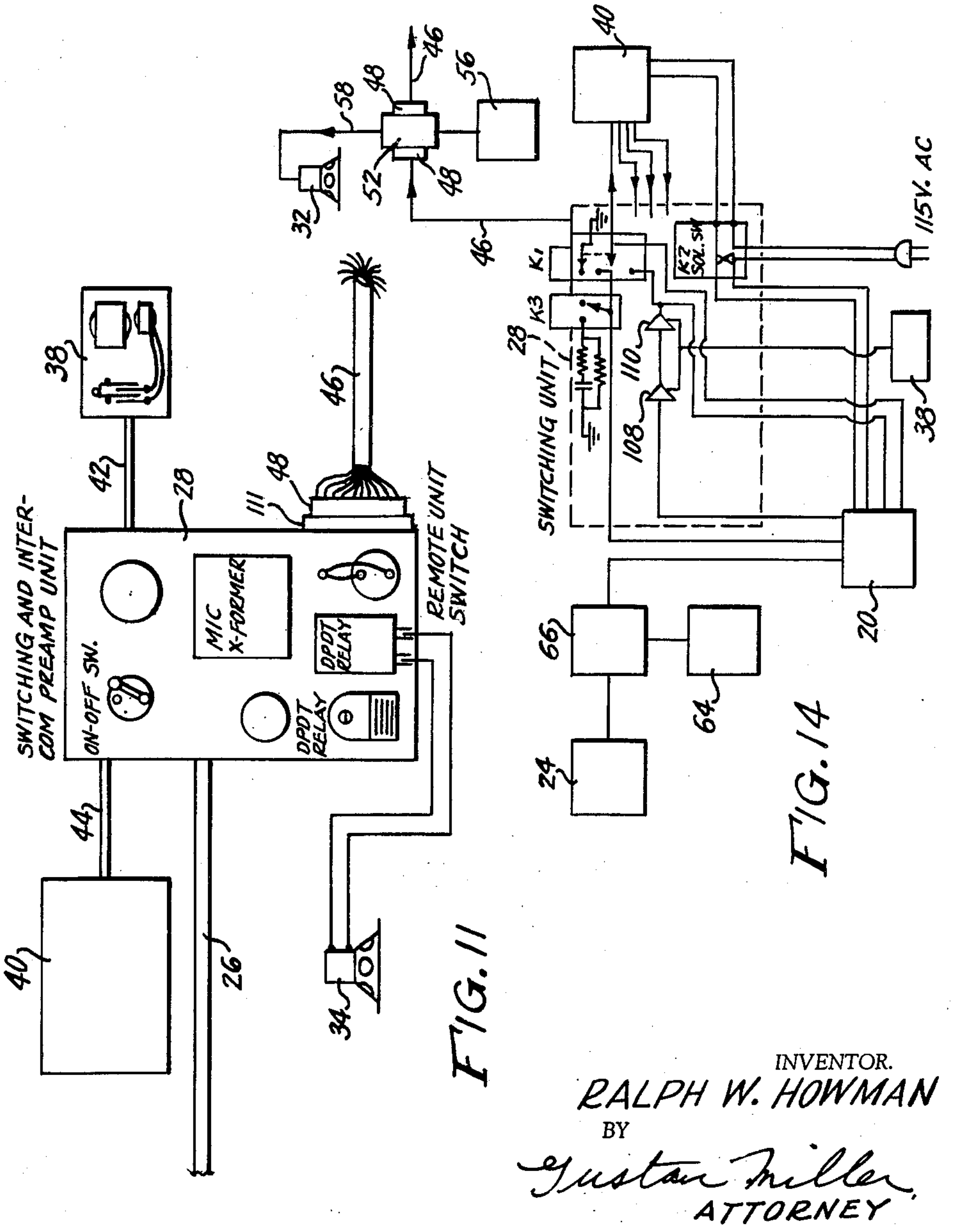
FIG. 11 is an elevation of the intercommunication and switching unit, power amplifier and power supply units.
FIG. 14 is an abbreviated wiring diagram of the switching and intercommunication circuits.

The switching unit 28 is shown in more detail in FIG. 11 with its associated items 34, 38 and 40, and its block wiring diagram in abbreviated form is shown in FIG. 14, with connections to one of the remote stations and to the panel 20 and tuner and audio program preamplifier units 64 and 66 and record changer 24. FIG. 11 which is largely structural in nature shows the low voltage power supply unit 38 connected by cable 42 to the switching unit 28. The power amplifier 40 is connected to the unit by cable 44 and in turn this unit is connected by cables 26 to tuner and preamplifier 20 as shown in FIG. 1 and to speaker 34 as well as to cable 46 through complementary male and female plugs 111 and 48, respectively. The unit 28 has thereon the shown on-off switch and the labelled microphone transformer and double pole double throw relays and remote unit switch.

Figures 12, 13:
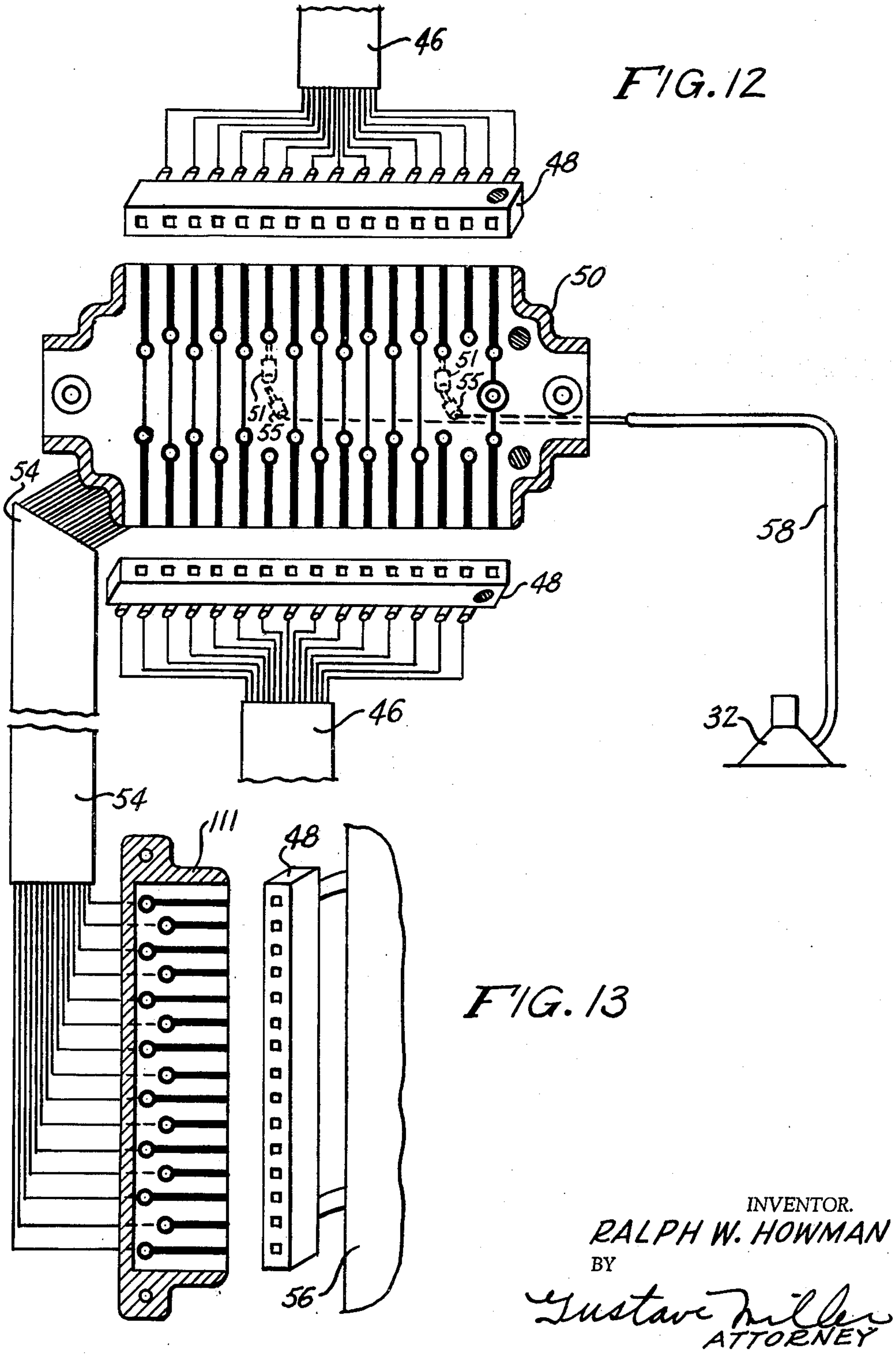
FIG. 12 is an elevational view of a multiple interconnector plug.
FIG. 13 is an elevational view of the connection at the lower end of the drop cords.

FIG. 14 is a block wiring diagram. In this figure, the roll-out changer 24 is shown connected to the preamplifier 66 to which the tuner 64 is also connected, the lines between the indicated elements representing the required wiring. The tuner 64 and preamplifier 66 are mounted on the panel 20 as shown in FIGS. 1 and 2, while the changer is mounted below the panel 20. The amplifier 108 and 110 is powered by the low voltage power supply and is connected to the panel as an input through the intercom relay to the power amplifier 40. The power amplifier 40 and panel 20 are supplied by the wall plug 115 v. A.C. through the solenoid operated on-off switch K2. The remotely operated relay K3 shunts the amplifier 40 by the resistance capacity pad as shown in FIG. 14 to operate as a remote volume control. The output from the switching unit is connected to the connector box 52, which is connected on the one hand to speaker 32 and on the other to control unit 56. The connector box is also connected to another connector block as shown in FIG. 1. As shown in FIGS. 11 and 13, for example, the cable 46 is of multiple wire form and the appropriate wires are connected properly as is understood in the art.

A plan view of one of the connector boxes 52 is shown in enlarged detail in FIG. 12. This box has a male printed board 50 forming male connections on two sides, with printed circuits for its internal contacts, against which the terminal contacts of the female plugs 48 are slid when the plugs are properly mated. Two miniature connectors 51 are provided for loudspeaker leads also.

Referring back to FIG. 14, the intercommunication preamplifier 108 is a voltage amplifier of standard design, using vacuum tubes or transistors. Amplifier 110 is a cathode follower or emitter follower. Where preamplifiers are vacuum tubes, power may be supplied from power amplifier or by B+ and filament supply as optional equipment on supply as shown. This supply may also furnish B+ and filament for tuners not self-powered. This unit 28 together with the remote units and preassembled cabling comprise the unique and essential features of this system.

Figure 15:
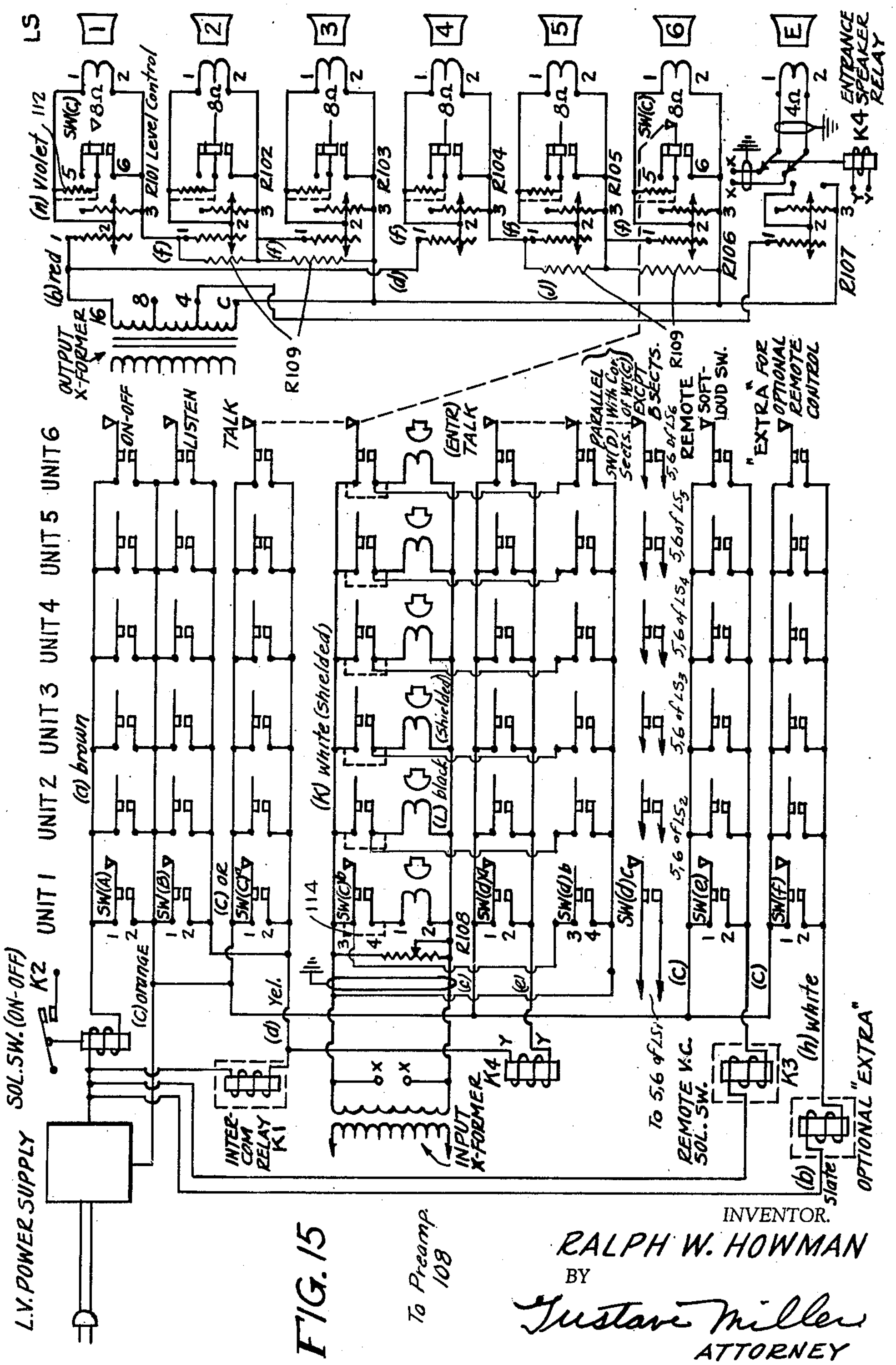
FIG. 15 is a switching and cable wiring diagram of the system.

FIG. 15 shows a more detailed wiring diagram of the control circuits, which is self-explanatory, indicating the operation of the system.

In FIG. 15, which shows the wiring diagram of the control and distribution system, the units 1, 2, 3, 4, 5, 6 etc., LS1, 2, 3, 4, 5, 6 etc. refer to the respective remote controls, microphones, speakers in the various rooms.

The dotted line 112 between terminal 5 in switch C and terminal 2 of the level control represents a plug in jumper.

While FIG. 15 shows a working diagram of the wiring with the color coded to help the home mechanic to make the necessary connections without severe effort or error, and should need no explanation, the following further explanation is given therefor. As can be seen in FIG. 15, a plurality of switches SW(A) are connected in parallel, one for each unit. These switches are on-off switches and cause operation of the solenoid switches (on-off). Similarly, switches SW(B) are connected in parallel and cause operation of the intercommunication relay K1 and switches SW(C)*a* are also connected in parallel. These switches respectively are pressed for listening or for talking at a particular unit. Shielded cables are provided to the various parallel connected microphones each connected in series with its own switch SW(C)*b*. The switches SW(C)*a* and SW(C)*b* are unicontrolled as shown. Operation of switch SW(*d*)*d* causes operation of relay K4 and intercom relay K1. Closing of any switch SW(*e*) causes operation of relay K3 to change the volume by switching the connection at the shunt pad shown in FIG. 14 connected to K3. Further optional equipment may be provided, for example, as shown at SW(*f*) to operate the optional extra relay.

Speakers in the various units are shown marked 1–6 and the entrance speaker is marked E. This entrance speaker is controlled by relay K4 mentioned above and shown a second time, for clearness only, as indicated by the letters YY at these showings. The letters XX indicate the connection of the entrance speaker E to the XX near the input transformer at the bottom left of FIG. 15. When the (ENTR) talk switch is not pressed, the entrance speaker, which then acts as a microphone, is connected to XX at the bottom right of FIG. 15 to XX at the middle left of the figure and sounds in the entrance may be amplified and heard at any location. When this switch is pressed the solenoid K4 will connect the speaker E to output taps 4 and 6 of output transformer 16 at the top right of this figure. The switches SW(C)*b* are paralleled with the correct section of SW(D)*d* so that a particular microphone may be connected in the circuit. Connection is not shown in the drawing since this would make the drawing hard to understand.

The various loudspeakers that are shown in FIG. 15 are at the various rooms, except as noted above, the entrance speaker E is at the entrance. The local volume controls are labelled 2 and they may be manipulated to vary the volume while the switches SW(C) are each unicontrolled to cut down the local volume of the speaker when the talk button is pressed at the position of any unit as shown, for example, by the unicontrol indicated by dotted lines at unit 6.

The dotted line 114 between terminals 3 and 4 on switch C represents a jumper shunt, to provide means of changing from system with all microphones and speakers live when intercommunication switch is pressed to one where the speaker is shunted and the microphone connected at the calling station only—simply by changing the plug in jumper 114 from switch C terminals 3 and 4 to terminals 5 and 6. With the jumper 114 as shown in FIG. 15, all of the microphones are connected to the primary of the transformer as shown. With the jumper 114 moved to terminals 5, 6 the microphone is connected into the circuit only at the individual unit when the respective switch SW(C)*b* is closed. At terminals 5, 6 the jumper connects resistance 112 in shunt with the speaker at the respective unit.

The variable resistor R108 placed across the primary of the intercommunication input transformer represents the gain control.

The resistances R109 shown connected across the volume controls of units 2 and 3 are each 8 ohms, so that when all three units are connected to the audio output transformer of 16 ohms, the transformer terminates in its proper impedance. When only one or two units are utilized, the resistance R109 is removed. The units 5 and 6 are also supplied with removable resistances R109 in the same way. It is obvious that the system is sufficiently flexible so that any number of units between 1 and 6 or more may be connected to the output transformer and still obtain a proper match.

The cable terminals were connected to coded color conductors as designated on the schematic diagram, as follows:

| Cable terminal | Schematic Symbol | Color | Drop box wiring | | Switch box wiring |
|---|---|---|---|---|---|
| 1 | *a* | Brown | 1 drop every unit | Straight thru | term. 1–Sw(A). |
| 2 | *b* | Red | 1 drop on 1,4–(7) only | do | term. 1 on Level Control (units 1, 4 and 7). |
| 3 | *c* | Orange | 1 drop on every unit | do | term. 2–Sw(A) to 1 Sw(B) to 1 Sw(C) to 1 Sw(D) to 1 Sw(E) to 1 Sw(F). |
| 4 | *d* | Yellow | do | do | term. 2 Sw(B) to 2 Sw (C). |
| 5 | *e* | Green | do | do | term. 2 Sw(D). |
| 6 in | *f* | Blue | 1 drop on 2, 3, 5, 6, 8, and 9 | Series (broken) | tie to term 1 on Level Control units. |
| 9 | *h* | White | 1 drop every unit | Straight thru | term. 2 Sw (F). |
| 10 | *j* | Black | 1 drop units 3, 6 and 9 to term. 2 LS. | do | tie to term. 3 Level Control to 6 Sw(C) to 6 Sw(D) to 2 LS. |
| 11 | *k* | White (shielded) | 1 drop every unit | do | term. 3 Sw(C) to 3 Sw(*d*). |
| 12 | {*l* | Black (shielded) | do | do | term. 2 mike. |
| | {*m* | #22 Russ | | | #1 mike to 4 Sw(C). |
| 13 | *n* | Violet | 1 drop every unit | term. 1 speaker (no cable). | term. 2 Level Control to 5 Sw(C) to 5 Sw(D). |
| 15 | | Shield conn | | Straight thru | |
| 8 | *p* | Slate | 1 drop every unit | do | |
| 6 out | *f* | Blue and White | 1 drop units 1, 2, 4, 5, 7, 8 and term. 2 LS. | Series | #14 pin block to term. 6 Sw(C) to 6 Sw(D) to 3 on Level Control. |

To recapitulate, this audio intercommunication remote control and distribution system is an integrated pre-wired system of remote control and sound distribution that provides the following advantages:

(1) It is a complete built-in system of audio and intercommunication that can be added to existing homes by an amateur without doing any skilled wiring. All the wiring is pre-assembled, and only openings for speakers and control units need be cut in the ceiling and walls, plus holes drilled through plates in the attic to allow drop cords to be installed through the walls to each station.

(2) Each station operator can turn the entire system on or off, initiate calls to all stations, receive calls from all stations, control "talk" or "listen" functions to one or more entrance stations, provide continuously variable level at station speaker, provide step control of level of program material over all stations, and provide for remote switching of TV or other appliances at any station.

(3) All wires are concealed inside walls, all cabinets are built-in between studs, except optional plug-in wall plate in place of master unit 20 and record player 24, where user may already own existing components in cabinets. All connecting cables 46 between stations are made in random lengths and are interchangeable for maximum flexibility to suit the requirements of any particular installation.

(4) It is a completely flexible system of feed-through parallel switching wiring plus series parallel hook-up of loudspeakers made possible by special design of printed circuit board male plug connectors used to interconnect cables to different stations and drop cords to individual station control units.

(5) Matching plugs and dimensions of unit 20 may be made to accommodate existing audio signal components (such as tuners, pre-amplifiers and power amplifiers) so that switching unit 28 plus associated items 56, 36, 34, 46 and 54 are all that is needed to add all the features pointed out in paragraph 2 above to existing popular brands of manual control, one room units.

(6) By moving one jumper as outlined in switching and cable schematic diagram of FIG. 15, all or any units may be changed from a system having both speaker and microphone live (where anyone may answer a call without pushing talk button) to a system where the microphone is connected only when intercommunication talk button is depressed and the local speaker is then shunted. This allows for optimum convenience of operation where feed-back is no problem—or connection so as to ovecome severe speaker to mike feed-back problems where the home mechanic has placed the speaker too near the mike.

The timer clock provides for automatic on-off switching of the system at predetermined time. A 110 volt outlet may be operated on unit 20 from this clock.

Summarizing further, this system provides means of adding features of complete custom music system to any home by anyone familiar with a saw, a drill, and a screw driver. It saves the cost of skilled custom wiring with unique pre-wired interchangeable cables and drop cords, while adding remote control features seldom found in the most expensive home installations. It is adaptable to all popular makes of components. Units may be added singly without upsetting impedance matching. No soldering or cutting of wires should be required in any installation. All units are easily removable for servicing. All cables have color coded plugs to avoid errors in connecting the plugs improperly. Low voltage power supply furnishes direct current for switching, transistor amplifiers or tube filaments in unit 28.

Many obvious changes in details and arrangements of parts of the system may be made without departing from the spirit and scope of the present invention.

Having thus set forth and disclosed the nature of this invention, what is claimed is:

1. In a loud speaker system having a speaker at each of a plurality of separated zones of a building, a signal output device at a location remote from the speakers provided with leads attached to respective terminals of a plug-in connector located in a first speaker zone, a series of separate cables extending from the first speaker zone through each of the speaker zones to a final speaker zone, a plug-in connector at each end of each cable having terminals attached to respective conductors of the cables, a terminal box at each zone having means to receive the two connectors at each zone and detachably contact respective terminals thereof, conductive leads within the terminal boxes interconnecting predetermined contact means therein, a pair of individual connectors attached to respective contact means within the terminal box for connection to the speaker terminals at the respective zone, a multiconductor drop cord at each zone with the conductors at one end connected to predetermined terminals of a plug-in connector and the conductors at the other end connected to predetermined leads within the terminal box at the respective zone, a control panel at each zone including a volume control for the respective speaker, comprising resistive means having a fixed value and an adjustable tap, said panel having terminals to which the ends of the resistive means and the tap are respectively connected and to which the drop cord connector may be detachably connected, the respective cables, terminal boxes, drop cords and plug-in connectors being prewired as separate units such that upon interconnection of the series of units, the signal output device is connected to all of the loud speakers and volume controls, the resistive means being connected to have a value substantially that of the signal output device and the speaker at each zone being connected between one terminal of the respective resistive means and the adjustable tap.

2. In a loudspeaker system as defined by claim 1 in which the resistive means are connected in series.

3. In a loudspeaker system as defined by claim 1 wherein each control panel supports a microphone and a series connected switch and terminals therefor, a microphone transformer at the remote location having its secondary connected to the input of the signal output device, the respective cables and drop cords including suitable conductors respectively connected to terminals of the plug-in connectors, and the terminal boxes being correspondingly connected to the respective drop cords, such that upon interconnection of the units, said microphones and respective series switches are connected in parallel to the primary of the microphone transformer.

4. In a loudspeaker system as defined by claim 3 wherein each control panel further supports a level control switch, a relay and an electrical impedance at the remote location, the respective cables and drop cords including suitable conductors respectively connected to terminals of the plug-in connectors, and the terminal boxes being correspondingly connected to the respective drop-cords such that upon interconnection of the units, said level control switches are connected in parallel in operative relation to the relay whereby closure of any level control switch controls the relay to connect the impedance in shunt with the signal output device.

5. In a loudspeaker system as defined by claim 3 including a microphone speaker located at a further zone and normally connected to the primary of the microphone transformer for transmitting audio signals, a relay at the remote location for connecting said microphone-speaker to the output of the signal output device upon energization thereof, each control panel supporting an intercommunication switch having terminals, the respective cables and drop cords including suitable conductors respectively connected to terminal of the plug-in connectors, and the terminal boxes being correspondingly connected to the respective drop cords, such that upon interconnection of the units the intercommunicating switch is operatively connected to the relay to control energization thereof.

References Cited in the file of this patent

UNITED STATES PATENTS

| | | |
|---|---|---|
| 2,092,897 | Hopkins | Sept. 14, 1937 |
| 2,496,398 | Lambert | Feb. 7, 1950 |
| 2,778,875 | Wiles et al. | Jan. 22, 1957 |
| 2,813,152 | Blow | Nov. 12, 1957 |
| 2,843,682 | Schretzmayer | July 15, 1958 |
| 2,856,461 | Beilfuss | Oct. 14, 1958 |

OTHER REFERENCES

"Acoustical Engineering," Olson, March 1957, publisher, Van Nostrand Co., New York, pp. 531–532.